United States Patent [19]
Johnson et al.

[11] Patent Number: 5,218,653
[45] Date of Patent: Jun. 8, 1993

[54] POLARIZATION CONVERTER WITH APODIZED ACOUSTIC WAVEGUIDE

[75] Inventors: John J. Johnson, Middletown; David A. Smith, Freehold, both of N.J.

[73] Assignee: Bell Communications Research, Inc., Livingston, N.J.

[21] Appl. No.: 790,668

[22] Filed: Nov. 8, 1991

[51] Int. Cl.$^5$ ............................................. G02B 6/14
[52] U.S. Cl. ............................................. 385/11; 385/7
[58] Field of Search ............................. 385/11, 7, 1, 2

[56] References Cited

U.S. PATENT DOCUMENTS 4,738,501  4/1988  Sunagawa et al. ................. 385/7
5,002,349  3/1991  Cheung et al. ................. 350/96.13

OTHER PUBLICATIONS

G. R. Fowles (ed.), *Introduction to Modern Optics*, 2nd ed., Holt, Rinehart and Winston: 1975, pp. 138–139.
D. P. Morgan, "Surface-Wave Devices for Signal Processing," Elsevier: 1985, pp. 61–64.
R. C. Alferness, "Optical directional couplers with weighted coupling," *Applied Physics Letters*, 1979, vol. 35, pp. 261–262.
Y. Yamamoto et al., "Guided-Wave Acoustooptic Tunable Filters Using Simple Coupling Weighting Technique," *Proceedings of 1990 IEEE Ultrasonics Symposium*, 1990, pp. 605–608.
J. Frangen et al., "Integrated optical acoustically tunable wavelength filter," Electronics Letters, 1989, vol. 25, pp. 1583–1584.
E. Voges et al., "Integrated-Optic Devices on LiNbO$_3$ for Optical Communication," *Journal of Lightwave Technology*, 1987, vol. Lt-5, pp. 1229–1237.

*Primary Examiner*—John D. Lee
*Assistant Examiner*—Phan T. Heartney
*Attorney, Agent, or Firm*—Leonard Charles Suchyta; Charles S. Guenzer

[57] ABSTRACT

An apodized acousto-optic polarization converter in which two acoustic waveguides are (14, 20) are formed in a substrate and are separated by a small gap (18) such that the two acoustic waveguides act as a directional coupler in which acoustic power is transferred back and forth. An interdigitated transducer (12) launches a surface acoustic wave in the first acoustic waveguide, and an optical waveguide is formed in the middle of the second waveguide. An acoustic absorber (26) is formed over both acoustic waveguides at a distance from the transducer such that the acoustic wave is transferred from the first to the second waveguide and back again. Thereby, the optical signal in the optical waveguide is exposed to an acoustic power density that slowly increases to a maximum and then decreases with the result that the side lobes of the frequency spectrum for the converted signal are greatly reduced. The converter may be used as an electrically tunable optical filter using orthogonal input and output polarizers (30, 32).

10 Claims, 3 Drawing Sheets

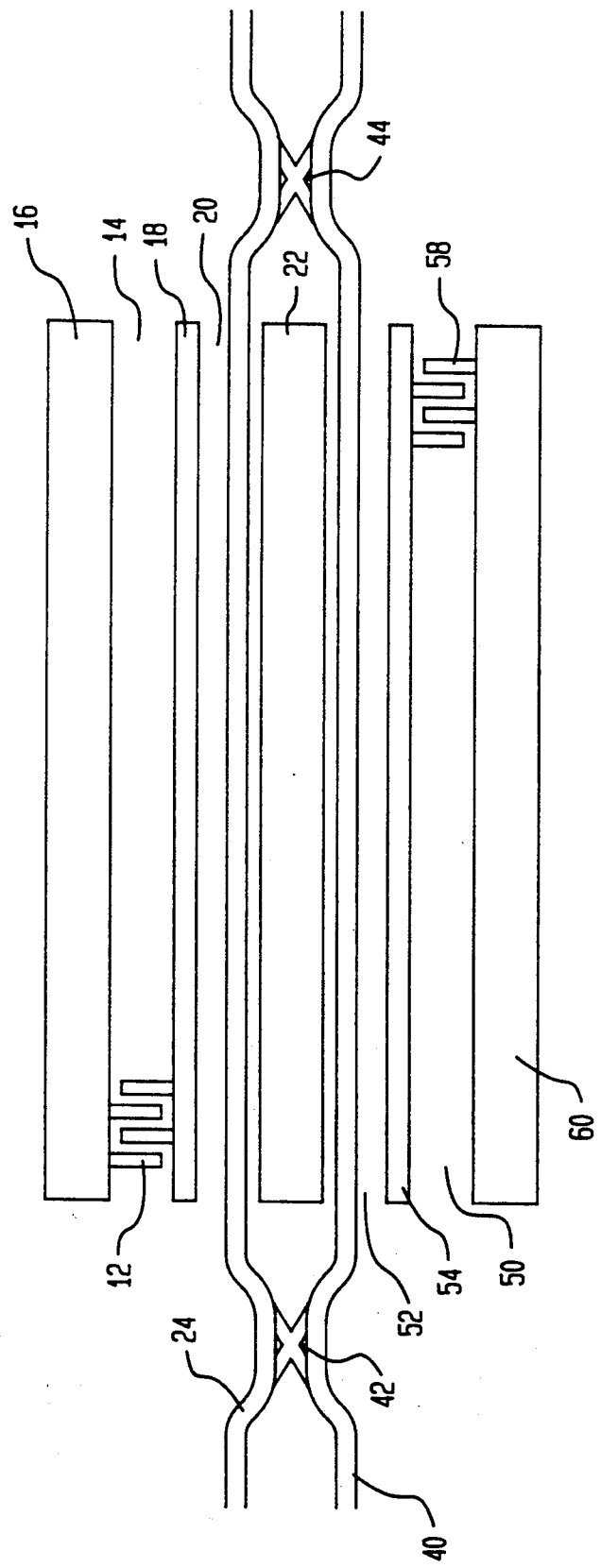

POLARIZATION CONVERTER WITH APODIZED ACOUSTIC WAVEGUIDE

FIELD OF THE INVENTION

The invention relates generally to acousto-optical polarization converters, such as acousto-optical filters. In particular, the invention relates to a shaped acousto-optical interaction achieved by a surface acoustic directional coupler.

BACKGROUND ART

An acousto-optical filter is one example of an acousto-optical polarization converter. In such a converter, a transducer of interdigitated electrodes is formed at the surface of piezo-electrical material and is electrically driven by an RF-frequency signal to launch an acoustic wave at the surface of the material. The surface acoustic wave acts as a periodic index grating for input optical radiation, and it provides for quasi-phase-matched conversion between orthogonally polarized eigenstates having substantially different refractive index. The interaction rotates the polarization of that wavelength of light for which the momentum mismatch between polarization states nearly exactly matches the acoustic wave momentum. Placing the converter between crossed broad-band polarizers allows it to operate as a narrow-band acousto-optical tunable filter (AOTF).

Many of the early AOTFs relied on bulk acoustic waves and dissipated large amounts of RF power. More recent devices have reduced the power levels by launching only a surface acoustic wave, by using an acoustic waveguide to guide the surface acoustic wave along only a limited cross-section of the surface, and by using optical waveguide so that the surface acoustic wave need only interact with the light over a limited cross-section. By combining these refinements, the RF power consumption of AOTFs has been reduced to less than 10 mW/channel, allowing for their practical use in many applications. For example, an AOTF is envisioned for filtering one or more channels of a wavelength-division multiplexing (WDM) optical communication system. Filtering of multiple channels multiplies the RF power applied to the AOFT, thus increasing the thermal problems as well as severely limiting the channel capacity. Finally, for commercial telephone usage, the RF power must be minimized to reduce cost.

Acousto-optical converters further suffer from high-intensity frequency side lobes. Although the central lobe can be made exceedingly narrow, the intensity of the side lobes remains proportionally constant in most designs. For a single-stage abrupt turn-on AOTF, the first side lobe is typically reduced by only 10 dB from the resonance. High side lobes reduce the filtering effectiveness by causing optical leakage between neighboring wavelength channels, and they impose design constraints on the use of an AOTF in a WDM system. Cheung et al. disclose in U.S. Pat. No. 5,002,349, incorporated herein by reference, a multi-stage AOTF having reduced side lobes. However, the serially connected multiple stages need to be acoustically isolated from each other. Therefore, their AOTF needs multiple transducers and extends over a substantial length. This design increases cost and introduces processing variations between different portions of the AOTF. Furthermore, a severe type of crosstalk, called coherent crosstalk, is not significantly reduced by serially connecting two filters with high side lobes.

Fowles defines apodization in the text *Introduction to Modern Optics*, 2nd ed. (Holt, Rinehart and Winston, Inc., 1975), pp. 138–139 as "any process by which the aperture function is altered in such a way as to produce a redistribution of energy in the diffraction pattern." He shows that the diffraction pattern through an apodized slit reduces spatial side lobes. Morgan discusses apodized transducers in surface-wave devices in his treatise *Surface-Wave Devices for Signal Processing* (Elsevier, 1985), pp. 61–64. His apodized launching transducer has interdigitated electrodes having an overlap between neighboring electrodes that varies along the direction in which they launch the surface acoustic wave. The frequency response of the device depends on the details of the apodization. Alferness discloses an optical directional coupler in "Optical directional couplers with weighted coupling," *Applied Physics Letters*, volume 35, 1979, pp. 260–262 in which two optical waveguides forming an optical directional coupler approach each other across a precisely chosen gap or interaction region that varies in a carefully chosen manner. He is thereby able to reduce the size of the frequency side lobes. He obtains his best results with a Hamming function taper of the gap although raised cosine tapering is also effective.

Yamamoto et al. propose an apodized acousto-optic converter in "Guided-Wave Acoustooptic Tunable Filters Using Simple Coupling Weighting Technique," *Proceedings of 1990 IEEE Ultrasonics Symposium*, 1990, pp. 605–608. The apodization is achieved by tapering the acoustic waveguide, in the middle of which runs an optical waveguide. The varying cross-section causes the acoustic energy density in the acousto-optic interaction region to begin at a small value, increase slowly to a maximum value, and thereafter decrease. However, we have determined that this technique is difficult. If the acoustic power is to be gradually concentrated in the narrowing acoustic waveguide, the acoustic wave must be adiabatically compressed or else a great deal of energy is lost as higher-order modes exceed the waveguide cutoff frequency and leak into the substrate. Adiabatically tapered waveguides have proven difficult to fabricate.

SUMMARY OF THE INVENTION

The invention can be summarized as an apodized acousto-optic polarization converter in which a surface acoustic wave is launched in one surface acoustic waveguide which is directionally coupled to a second surface acoustic waveguide in the middle of which runs an optical waveguide. The interaction length in the second acoustic waveguide is such that the power density of its acoustic wave spatially varies from a minimum to a maximum and back to a minimum. Thereby, the acoustic energy in the second acoustic waveguide is apodized and the side lobes of the interaction with the optical signal are reduced.

BRIEF DESCRIPTION OF THE DRAWINGS

FIG. 3 is a plan view of a third embodiment of the invention providing both polarization-independent conversion and equal frequency shifts.

DETAILED DESCRIPTION OF THE PREFERRED EMBODIMENT

Figure 1:
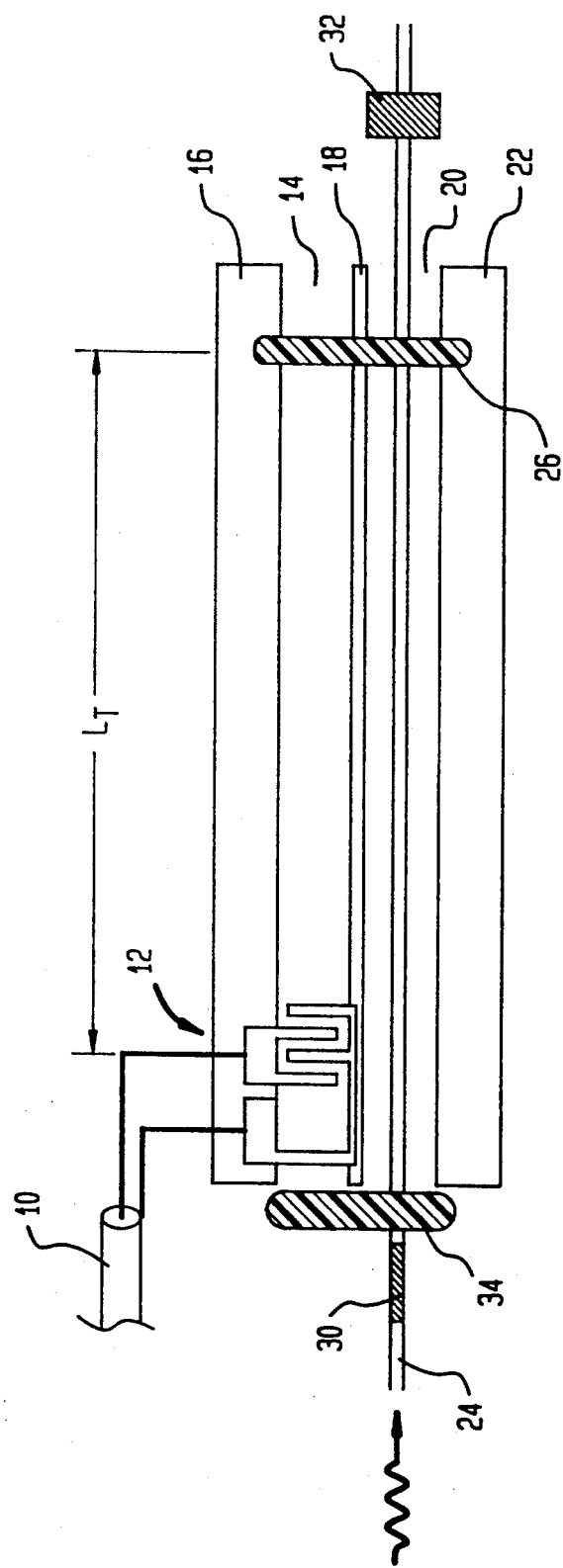
FIG. 1 is a plan view of a first embodiment of the invention.

An embodiment of the invention is illustrated in plan view in FIG. 1. A co-axial line 10 feeds an RF signal through a suitable unillustrated matching network to an interdigitated transducer 12, which launches a surface acoustic wave in a launching acoustic waveguide 14 which it overlies. The launching acoustic waveguide 14 is defined on one side by a surface acoustic wave barrier 16 and on the other side by a narrow surface acoustic wave gap 18 separating it from an interaction acoustic waveguide 20, defined on its other side by another surface acoustic wave barrier 22. An optical waveguide 24 runs through the middle of the interaction acoustic waveguide 20 and receives an optical signal to be converted by the RF signal.

Each of the acoustic waveguides 14 and 20 is singly moded, and power is transferred from the launching waveguide 14 to the interaction waveguide 20, as a function of the axial distance x according to the equation $$P_2(x) = P_1(0) \sin^2(\kappa \chi). \tag{1}$$

That is, acoustic power is gradually transferred into the interaction waveguide 20 and, after reaching a maximum, is transferred back to the launching waveguide 14. The coupling coefficient $\kappa$ depends exponentially on the gap 18 between the two waveguides 14 and 20 because the evanescent surface acoustic wave decays exponentially into the gap 18. An acoustic absorber 26 is positioned over the waveguides 14 and 20 a distance $L_T$ from the transducer 12 such that $$\kappa L_T = \pi, \tag{2}$$

that is, the energy density of the acoustic wave in the interaction waveguide 20 spatially varies from a minimum to a maximum to a minimum over a distance $L_T$. As a general rule, the length $L_T$ is maximized to minimize the power requirement ($P \approx L_T^{-2}$) and the bandwidth ($\Delta\lambda \approx L_T^{-1}$).

Such an apodized interaction region provides a varying acoustic energy density that reduces the side lobes for the acousto-optic interaction occurring in the interaction waveguide 20. The acousto-optical interaction strength $\kappa_{AO}$ varies as $P_{SAW}^{\frac{1}{2}}$ or as $\sin(\kappa\chi)$, resulting in a raised-cosine interaction strength. Light on the optical waveguide 24 experiences a quasi-stationary acousto-optical grating for a brief period of time. The optical frequency response of the prior-art abrupt turn-on and turn-off would have the characteristics of the sinc-squared Fourier transform of a rectangular-pulse interaction, having an envelope of $(\lambda-\lambda_0)^{-2}$. On the other hand, for the apodized interaction with a raised-cosine turn-on, the envelope falls off as $(\lambda-\lambda_0)^{-4}$.

The acousto-optic converter converts the polarization of the light traveling on the optical waveguide 24 and having an optical frequency corresponding to the RF frequency impressed on the transducer 12. That is, the RF frequency determines the optical frequency of the converted light. Such a converter can be made into an electrically tunable filter by positioning an input polarizer 30 on one side of the converter and output polarizer 32 of the opposite polarization on the opposite side. Such polarizers are disclosed by Heffner et al. and Baran et al. in their patents. Only the light having its electrically selected polarization converted to the transverse polarization passes both polarizers 30 and 32.

EXAMPLE

An acousto-optic converter was fabricated and tested for RF frequencies of 175±15 MHz and optical wavelength of 1.5 μm in LiNbO$_3$. The acoustic barriers 16 and 22 and the gap 18 were formed following the technique disclosed by Frangen et al. in "Integrated Optical, Acoustically Tunable Wavelength Filter," *Electronics Letters*, volume 25, 1989, pp. 1583–1584. Stripes of Ti were deposited along the y-direction on an x-cut LiNbO$_3$ substrate to a thickness of 160 nm and patterned into the barriers 16 and 22 and gap 18. The barriers 16 and 22 had widths of 150 μm and the acoustic waveguides 14 and 20 had widths of 100 μm. The gap 18 was fabricated with a number of widths in the range of 10 to 150 μm, but a width of 20 μm provided satisfactory performance and an interaction length $L_T$ of 19 mm. The titanium was diffused into the the LiNBO$_3$ following the technique disclosed by Voges et al. in "Integrated-Optic Devices on LiNbO$_3$ for Optical Communication," *Journal of Lightwave Technology*, volume LT-5, 1987, pp. 1229–1237. Specifically, the substrate was placed in a platinum crucible and heated in an air ambient to 1050° C. After a first diffusion step lasting for 22.5 hours, two additional stripes of Ti having a thickness of 80 nm and a width of 8 μm were deposited in the middle of the two acoustic waveguides 14 and 20. One corresponded to the illustrated optical waveguide 24. The other was placed in the center of the launching acoustic waveguide 14 in order to advantageously make it symmetric with the interaction acoustic waveguide 20 and was not otherwise used. Then another diffusion step was performed for 8.5 hours. The result is a shallow optical waveguide in a deeper acoustic waveguide.

The transducer 12 had 20 pairs of fingers on 20 μm periods with widths and separations of 5 μm. The fingers were inclined at 5° from the perpendicular of launching waveguide 14 on x-cut LiNbO$_3$, in accordance with the teachings in the patent of Cheung et al. The transducer 12 was formed by depositing a 15 nm adhesion layer of Ti and then 150 nm of Au and was designed so that the finger electrodes do not cross the interaction waveguide 20. RF power was coupled into the transducer 12 through a 180 nH series inductor. The acoustic absorber 26 was formed by depositing a 1 mm width of rubber cement over and transverse to the acoustic waveguides 14 and 20. A second acoustic absorber 34 was placed in back of the transducer 12 to prevent a back-propagating surface acoustic wave.

An experiment determined the transfer of acoustic power in both directions between the launching waveguide 14 and the interaction waveguide 20 for a number of devices with varying gap width but without the optical waveguide 24. Generally, the acoustic power was observed to follow the spatial dependence of Equation (1). Extinction ratios between the peaks and nulls were in excess of 20 dB and were determined by direct measurement of propagating RF power in each of the acoustic waveguides 14 and 20 using pickup transducers matched to the launching transducer 12. This experiment determined the total interaction length $L_T$ required for the acoustic power to pass to the interaction waveguide 20 and back to the launching waveguide 14. It was observed to follow the relation $$L_T = L_0 e^{\beta g}, \qquad (3)$$

where g is the width of the gap 18 between the acoustic waveguides 14 and 20, $L_0 = 13.2$ mm and $\beta = 0.021$ $\mu m^{-1}$.

The acousto-optic converter of the example was optically tested by injecting TE-polarized narrow-band light at 1531 nm into the optical waveguide 24. The intensity passing through an external TM polarizer was monitored as a function of the swept frequency of the applied RF electrical field. The performance was optimized by selection of the RF drive power to perform nearly 100% conversion as determined by extinguishing the throughput on resonance for aligned TE input and output polarizers. The filter built according to the invention demonstrated side lobes were reduced by at least 15 dB from the central peak. A comparison filter operating with an abrupt turn-on of the acousto-optical interactions showed a first side lobe on the low frequency side that was about one-third (−5 dB) of the central peak.

Although the acousto-optic converter of the invention is useful as an RF tuned filter in conjunction with polarization means on the input and output, it may be used in its more general function of a frequency-selective polarization converter.

The polarization converter of the invention can be made polarization insensitive similarly to the polarization-insensitive converters of Cheung et al. As illustrated in plan view in FIG. 2, a second optical waveguide 40 is formed in the interaction acoustic waveguide 20. Additional unillustrated optical waveguides produce a symmetric structure. The first and second optical waveguides 24 and 40 are coupled on the input and output ends by adiabatic polarization beam splitters 42 and 44, such as disclosed by Baran et al. in U.S. Pat. No. 5,133,029. The polarization beam splitters 42 and 44 switch only one polarization of light from the first to the second optical waveguide 24 and 40 and vice versa. Only the light input on the first optical waveguide 24 having the selected frequency determined by the RF transducer 12 has the polarization of both its polarization components changed in the interaction acoustic waveguide 20 such that both its components are switched to the second waveguide 40.

Figure 2:
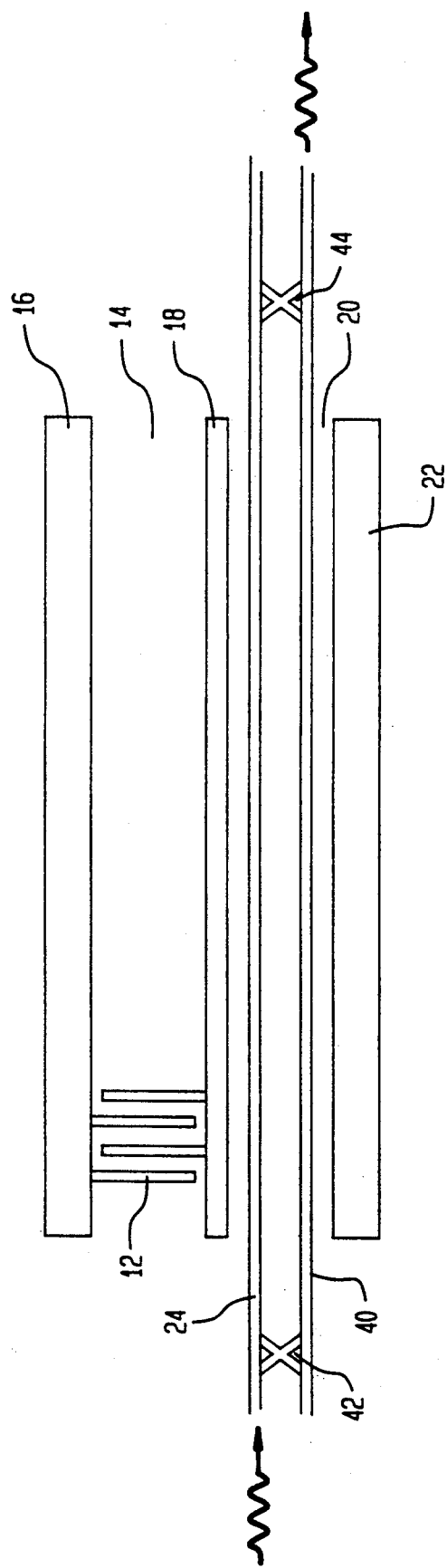
FIG. 2 is a plan view of a second embodiment of the invention providing polarization-independent conversion.

However, in the polarization conversion of FIG. 2, the two polarization components suffer a slight but opposite frequency shift, equal to the RF drive frequency in the polarization conversion of FIG. 2. This problem can be elminated using the polarization converter illustrated in plan view in FIG. 3. A second launching acoustic waveguide 50 and a second interaction acoustic waveguide 52 are formed by a second gap 54 and a third acoustic barrier 60. A second transducer 58 formed on the second launching acoustic waveguide 50 is placed at the opposite end from the first transducer 12 on the first launching acoustic waveguide 14 so that the surface acoustic waves counter-propagate on the two acoustic launching waveguides 14 and 50 and also on the two acoustic interaction waveguides 20 and 52, carrying optical signals propagating in the direction. That is, the relative velocity of the acoustic and optical waves are of opposite sign in the two acousto-optical interaction regions. The two optical waveguides 24 and 40 pass through respective acoustic interaction waveguides 20 and 52. The effect is that the same frequency shift is applied to the two components of the switched optical signal.

The invention thus reduces the side lobes of an acousto-optical tunable converter, e.g., filter, with an easily built, reproducible and short device.

What is claimed is:

1. An acousto-optic polarization converter, comprising:
   a first acoustic waveguide formed in a piezo-electric substrate;
   a second acoustic waveguide formed in said substrate and separated from said first acoustic waveguide in an interaction region by a gap supporting only an evanescent acoustic wave and across which acoustic power is coupled between said first and second acoustic waveguides;
   first means for launching a first surface acoustic wave into said interaction region of said first acoustic waveguide; and
   a first optical waveguide formed in and extending along said interaction portion of second acoustic waveguide.

2. A converter as recited in claim 1, further comprising an acoustic absorber formed over said second acoustic waveguide and being spaced from said first launching means by an interaction length such that said acoustic wave is transferred from said first to said second acoustic waveguide and back to said first acoustic waveguide in said interaction length.

3. A converter as recited in claim 2, wherein said first launching means comprises an interdigitated transducer formed over said first acoustic waveguide.

4. A converter as recited in claim 1, further comprising a second optical waveguide symmetrically formed in said first acoustic waveguide across said gap from said first optical waveguide.

5. A converter as recited in claim 1, further comprising a second optical waveguide formed in said second acoustic waveguide and extending in parallel to said first optical waveguide.

6. A converter as recited in claim 1, wherein said first and second acoustic waveguides and said gap extend substantially in a first direction and wherein said acoustic power is coupled between said first and second acoustic waveguides in a direction substantially transverse to said first direction.

7. An acousto-optical polarization converter, comprising:
   a first acoustic waveguide formed in a piezoelectric substrate;
   a second acoustic waveguide formed in said substrate and separated from said first acoustic waveguide by a gap across which acoustic power is coupled between said first and second acoustic waveguides;
   first means for launching a first surface acoustic wave in an interaction portion of said first acoustic waveguide adjacent to said second acoustic waveguide;
   a first optical waveguide formed in and extending along said interaction portion of second acoustic waveguide;
   a third acoustic waveguide formed in said substrate;
   a fourth acoustic waveguide formed in said substrate and separated from said second acoustic waveguide by a second gap across which acoustic power is coupled between said third and fourth acoustic waveguides;

second means for launching a second acoustic wave in an interaction portion of said third acoustic waveguide adjacent to said fourth acoustic waveguide;

a second optical waveguide formed in and extending along said interaction portion of second acoustic waveguide; and first and second polarization beam splitters coupling said first and second optical waveguides and disposed on respective sides of said interaction portions;

wherein said first and second launching means are respectively disposed to launch said first and second acoustic waves to counter-propagate with respect to optical signals carried from said first polarization beam splitter to said second polarization beam splitter respectively on said first and second optical waveguides in respective ones of said interaction portions.

8. An acoustio-optic polarization converter, comprising:

a surface acoustic wave directional coupler comprising a first acoustic waveguide and a second acoustic waveguide, wherein said coupler couples acoustic energy propagating in said first acoustic waveguide to said second acoustic waveguide and wherein a density of said energy coupled from said first to said second waveguide and propagating in said second waveguide along a first direction varies along said first direction;

a transducer disposed on said first acoustic waveguide; and an optical waveguide extending in and parallel to said second acoustic waveguide.

9. A converter as recited in claim 8, wherein said density continuously varies from a minimum value to a maximum value and back to said minimum value along said first direction.

10. An acoustic-optic polarization converter, comprising:

a first acoustic waveguide formed in a piezoelectric substrate;

a second acoustic waveguide formed in said substrate and separated from said first acoustic waveguide by a gap across which acoustic power is coupled between said first and second acoustic waveguides;

first means for launching a first surface acoustic wave in an interaction portion of said first acoustic waveguide adjacent to said second acoustic waveguide;

a first optical waveguide formed in and extending along said interaction portion of second acoustic waveguide;

a second optical waveguide formed in said second acoustic waveguide and extending in parallel to said first optical waveguide; and two optical polarization beam splitters coupling said first and second optical waveguides and separated by an interaction length in which said surface acoustic wave interacts with optical signals carried by said first and second optical waveguides.

* * * * *